United States Patent
Shekhar et al.

(10) Patent No.: US 9,816,335 B2
(45) Date of Patent: Nov. 14, 2017

(54) BYPASS FLUSHING FOR GAS EXTRACTION SYSTEMS

(71) Applicant: Halliburton Energy Services, Inc., Houston, TX (US)

(72) Inventors: Prashant Shekhar, Cypress, TX (US); Gillies Alexander MacDonald, Houston, TX (US); Robert James Costo, Jr., The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 27 days.

(21) Appl. No.: 14/904,174

(22) PCT Filed: May 29, 2015

(86) PCT No.: PCT/US2015/033300
§ 371 (c)(1),
(2) Date: Jan. 11, 2016

(87) PCT Pub. No.: WO2016/195638
PCT Pub. Date: Dec. 8, 2016

(65) Prior Publication Data
US 2017/0107773 A1     Apr. 20, 2017

(51) Int. Cl.
*B08B 9/00* (2006.01)
*E21B 21/06* (2006.01)
*E21B 21/08* (2006.01)
*E21B 21/10* (2006.01)
*E21B 47/10* (2012.01)
*E21B 47/06* (2012.01)
(Continued)

(52) U.S. Cl.
CPC ........ *E21B 21/067* (2013.01); *B01D 19/0063* (2013.01); *B08B 9/0325* (2013.01); *E21B 21/08* (2013.01); *E21B 21/106* (2013.01); *E21B 47/06* (2013.01); *E21B 47/10* (2013.01); *B08B 2209/032* (2013.01)

(58) Field of Classification Search
CPC ...... E21B 21/067; E21B 21/08; E21B 21/106; E21B 47/10; E21B 47/06; B01D 19/0063; B08B 9/0325; B08B 2209/032
USPC ...................................................... 134/22.12
See application file for complete search history.

(56) References Cited

U.S. PATENT DOCUMENTS 3,673,851 A     7/1972 Wright et al.
4,635,735 A     1/1987 Crownover
(Continued)

OTHER PUBLICATIONS

International Search Report and Written Opinion for PCT/US2015/033300 dated Dec. 14, 2015.

*Primary Examiner* — Eric Golightly
(74) *Attorney, Agent, or Firm* — McDermott Will & Emery LLP

(57) ABSTRACT

A method of operating a gas extraction system includes receiving a drilling fluid sample at a flow meter via a flow meter inlet conduit and discharging the drilling fluid sample into a flow meter outlet conduit. A first inline mud valve positioned in the flow meter inlet conduit and a second inline mud valve positioned in the flow meter outlet conduit are each closed to transition the gas extraction system to a bypass flushing configuration. A bypass flow meter valve positioned in a flow meter bypass conduit is opened to divert the drilling fluid sample around the flow meter. The flow meter is then flushed with flushing fluid by opening first and second flow meter flushing valves and starting a pump to circulate the flushing fluid through the flow meter.

10 Claims, 4 Drawing Sheets

(51) Int. Cl.
*B01D 19/00* (2006.01)
*B08B 9/032* (2006.01)

(56) References Cited

U.S. PATENT DOCUMENTS

| | | |
|---|---|---|
| 7,308,952 B2 | 12/2007 | Strazhgorodskiy |
| 2003/0085036 A1 | 5/2003 | Curtis et al. |
| 2011/0219853 A1 | 9/2011 | Henderson |
| 2013/0025874 A1 | 1/2013 | Saunders et al. |
| 2014/0048331 A1 | 2/2014 | Boutalbi et al. |
| 2014/0202767 A1 | 7/2014 | Feasey |

BYPASS FLUSHING FOR GAS EXTRACTION SYSTEMS

BACKGROUND

During the drilling of a hydrocarbon-producing well, a drilling fluid or "mud" is continuously circulated from the surface down to the bottom of the hole being drilled and back to the surface again. The drilling fluid serves several functions, one of them being to provide hydrostatic pressure against the walls of the drilled borehole to prevent wellbore collapse and the resulting influx of gas or liquid from the formations being drilled. The drilling fluid also cools the drill bit during operation and simultaneously transports wellbore cuttings and debris to the surface where they are subsequently separated from the drilling fluid. More specifically, upon returning to the surface, the spent drilling fluid is typically conveyed to various solids control equipment for cleaning or rehabilitation and then subsequently re-used.

One common component of the solids control equipment is a gas extraction system, which often includes one or more degassers. Flow meters are often used in the gas extraction systems to monitor the flow of the drilling fluid. Over time, however, drilling fluid residue may build up on the inner conduits and/or tubing of such flow meters, which can result in erroneous readings. To remove the built-up residue, well operators are often required to flush the entire system, which requires considerable downtime in assembling an appropriate flushing system, flushing the gas extraction system, draining the gas extraction system, and subsequently reconnecting the gas extraction system and associated flow meters back to the drilling fluid return line.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to wellbore drilling operations and, more particularly, to drilling fluid gas extractions systems that incorporate the use of a bypass flushing circuit used to remove solids buildup.

Embodiments described herein provide a gas extraction system that includes a flushing circuit used to flush solids buildup from at least one of a flow meter and a heater included in the gas extraction system. Solids have a tendency to build up on the inner workings and/or tubings of the flow meter and the heater, and such solids buildup should be flushed out to mitigate equipment degradation and drilling fluid data error and/or loss. The gas extraction systems described herein advantageously eliminate downtime on the system and data loss by allowing system flushing to occur without stopping drilling fluid circulation.

Figure 1:
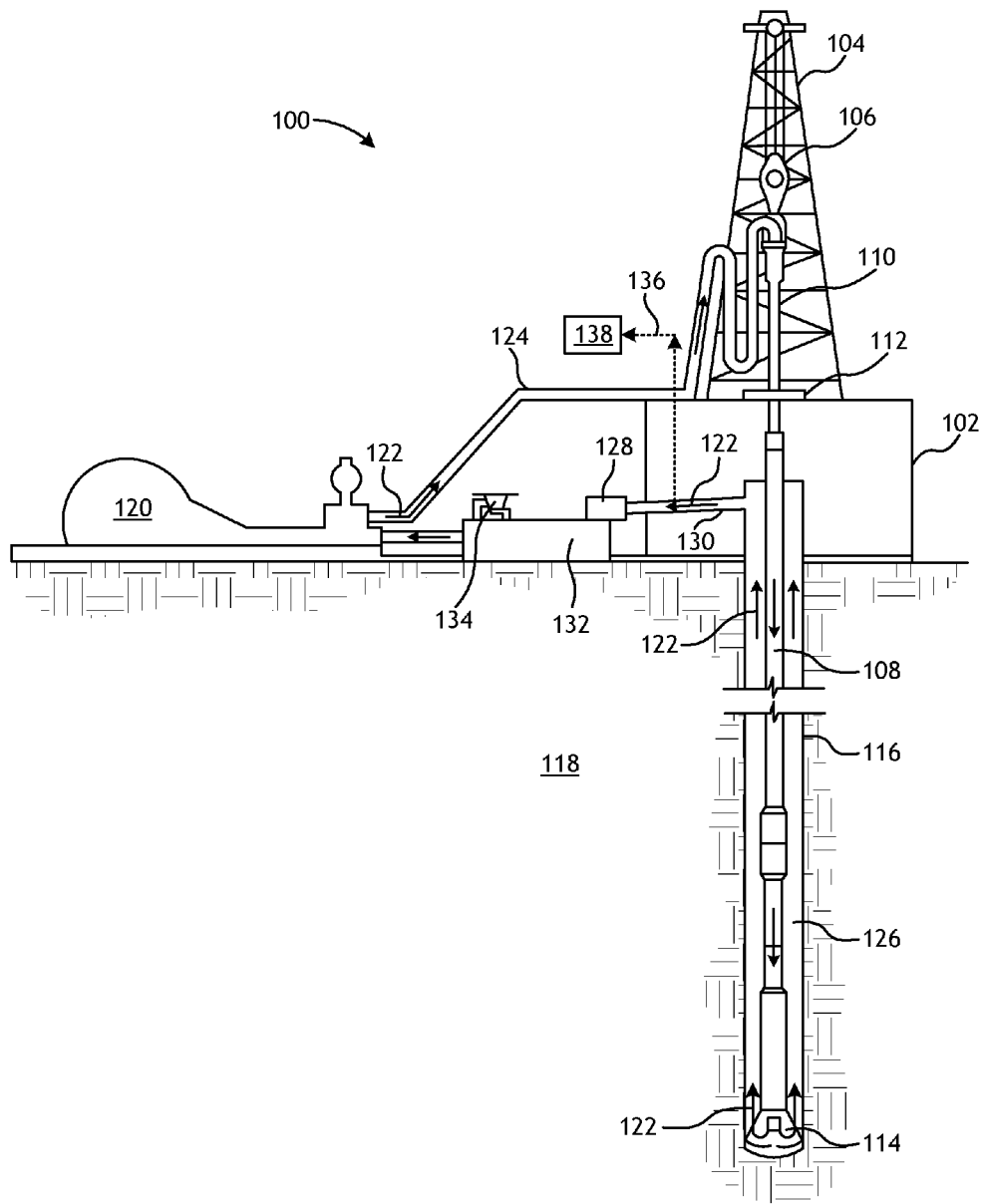
FIG. 1 is an exemplary drilling system that may employ the principles of the present disclosure.

Referring to FIG. 1, illustrated is an exemplary drilling system 100 that may employ the principles of the present disclosure. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. As illustrated, the drilling system 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 (or "mud") through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or "spent" drilling fluid 122 exits the annulus 126 and may be conveyed to one or more fluid processing units or solids control equipment 128 via an interconnecting flow line 130 fluidly coupled to the annulus 126. After passing through the solids control equipment 128, a "cleaned" drilling fluid 122 is deposited into a nearby retention pit 132 (i.e., a mud pit). One or more chemicals, fluids, or additives may be added to the drilling fluid 122 via a mixing hopper 134 communicably coupled to or otherwise in fluid communication with the retention pit 132.

The solids control equipment 128 may include, but is not limited to, one or more of a shaker (e.g., shale shaker), a centrifuge, a hydrocyclone, a separator, a desilter, a desander, a degasser, combinations thereof, and the like. The returning drilling fluid 122 may be continuously sampled during operation to measure various characteristics or parameters of the drilling fluid 122, such as flow rate, chemical composition, density, particle size distribution, etc. More particularly, as illustrated, a drilling fluid sample 136 may be extracted from the flow line 130 and conveyed to a gas extraction system 138, which may comprise at least one of a flow meter circuit and a degassing circuit. As described in more detail below, the flow meter circuit may include one or more flow meters used to monitor and track the flow rate of the drilling fluid 122, and the degassing circuit may include a heater used to increase the temperature of the drilling fluid sample 136 in preparation for a degassing unit.

According to the present disclosure, the gas extraction system 138 may include and otherwise incorporate a bypass flushing system used to remove solids or residue that may build up over time and thereby generally clean the tubing and/or inner workings through which the drilling fluid sample 136 is circulated. If the tubing and/or inner workings of the gas extraction system 138 are not periodically flushed, the associated flow meter(s) and heater may emit false or erroneous readings, which can be misleading as to the current state or parameters of the drilling fluid 122. As discussed below, the bypass flushing system may be initiated by opening and closing various selected valves in the gas extraction system 138 without stopping the extraction of the drilling fluid 122 from the flow line 130, and thereby providing uninterrupted drilling fluid 122 data with minimal or no adverse effects.

Figure 2:
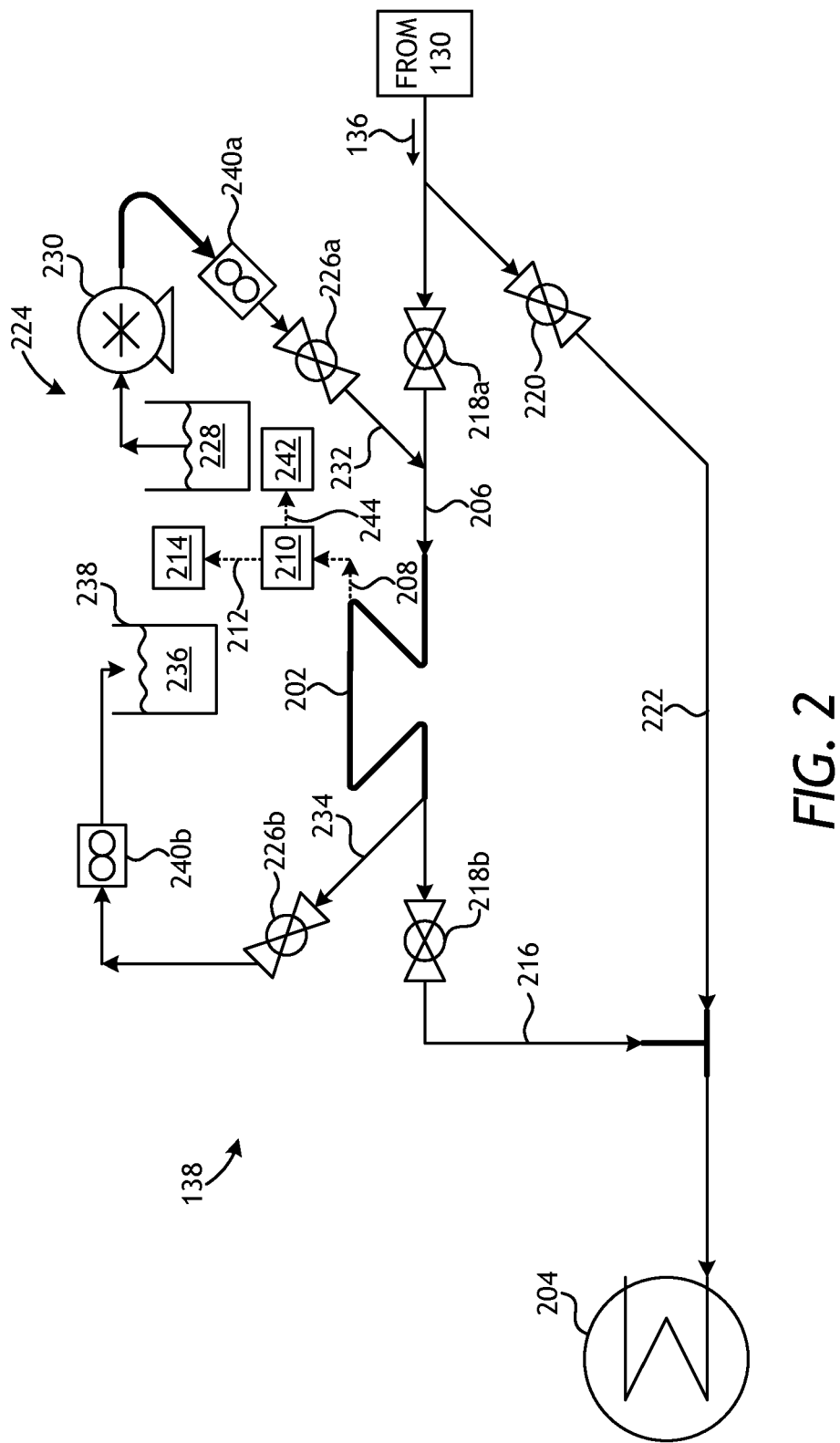
FIG. 2 is a schematic diagram of the gas extraction system of FIG. 1.

Referring now to FIG. 2, with continued reference to FIG. 1, illustrated is a schematic diagram of the gas extraction system 138, according to one or more embodiments. As illustrated, the gas extraction system 138 may include a flow meter 202 and a heater 204 fluidly coupled to the flow meter 202. In at least one embodiment, the flow meter 202 comprises a Coriolis flow meter. In other embodiments, however, the flow meter 202 may comprise any type of device or apparatus capable of measuring the flow rate of a fluid including, but not limited to, a mechanical flow meter, a pressure-based flow meter, an electromagnetic flow meter, an ultrasonic flow meter, or any combination thereof.

The gas extraction system 138 may be manipulatable or otherwise transitioned between a flow measurement configuration and a bypass flushing configuration. The flow measurement configuration may constitute normal operation of the gas extraction system 138. In the flow measurement configuration, the drilling fluid sample 136 may be conveyed to the gas extraction system 138 from the flow line 130 via a flow meter inlet conduit 206 that is fluidly coupled to the flow line 130. In some embodiments, a delivery pump (not shown), such as a peristaltic pump or another type of positive displacement pump, may be arranged in the flow meter inlet conduit 206 and serve to draw the drilling fluid sample 136 from the flow line 130 and pump it to the gas extraction system 138. Moreover, in some embodiments, a deaerator (not shown) may also be arranged in the flow meter inlet conduit 206 to remove dissolved gases from the drilling fluid sample 136 prior to reaching the gas extraction system 138.

The flow meter inlet conduit 206 may be fluidly or communicably coupled to the inlet to the flow meter 202. As the drilling fluid sample 136 circulates through the flow meter 202, the flow meter 202 may measure the flow rate of the drilling fluid sample 136 and generate a flow rate measurement 208. In some embodiments, the flow rate measurement 208 may be sent to a data acquisition system 210, which may be configured to receive and process the flow rate measurement 208. The data acquisition system 210 may be a computer system, for example, that includes a memory, a processor, and computer readable instructions that, when executed by the processor, process the signals from the flow meter 202 to provide an output signal 212. The output signal may be indicative of the real-time flow rate of the drilling fluid sample 136, which may correspond to the flow rate of the drilling fluid 122 (FIG. 1).

In some embodiments, the output signal 212 may be conveyed to one or more peripheral devices 214 for consideration and/or review by a well operator. The peripheral devices 214 may include, but are not limited to, a monitor (e.g., a display, a GUI, a handheld device, a tablet, etc.), a printer, an alarm, additional storage memory, any combination thereof, and the like. In some embodiments, the peripheral device 214 may be configured to provide the operator with a graphical output or display that charts the flow rate measurement 208, which may correspond to the ongoing and current flow rate of the drilling fluid 122 (FIG. 1).

After circulating through the flow meter 202, the drilling fluid sample 136 may exit the flow meter 202 and flow to the heater 204 via a flow meter outlet conduit 216 that fluidly couples the flow meter 202 and the heater 204. The heater 204 may be configured to increase the temperature of the drilling fluid sample 136 to a temperature suitable or required for degassing. The heater 204 may comprise any type of fluid-heating mechanism or device including, but not limited to, a circulation heater, an induction heater, a cartridge heater, an immersion heater, an electric resistive heater, and any combination thereof.

Over time, a solids buildup or residue may begin to grow within the inner workings or tubing of the flow meter 202, which may result in the flow meter 202 providing faulty or erroneous flow rate measurements 208. A sudden change in the flow rate measurement 208, for instance, may be an indication of solids buildup within the flow meter 202. In other cases, when the gain readings of the flow meter 202 reach on the higher side >70%, this may also be an indication of solids buildup within the flow meter 202. As known to those skilled in the art, gain readings are direct measurements of the percentage utilization of power supplied to a sensor. Gain readings are specific to Coriolis meters or meters that measure the multi-variable of the process with the vibrating flow tubes of Coriolis meters. Higher gain readings indicate that more power is required to vibrate the flow tubes at the natural or pre-defined frequency of the flow tubes, which indicates malfunction or, in this case, a potential indicator of solids buildup within the flow meter 202.

To remove the solids buildup from the flow meter 202, and thereby return the flow rate measurements 208 back to normal operation, the flow meter 202 may be flushed by transitioning the gas extraction system 138 from the flow measurement configuration, as described above, to the bypass flushing configuration. To accomplish this, the gas extraction system 138 may include a first inline mud valve 218a, a second inline mud valve 218b, and a bypass flow meter valve 220. As illustrated, the first inline mud valve 218a may be positioned in the flow meter inlet conduit 206 upstream from the flow meter 202, and the second inline mud valve 218b may be positioned in the flow meter outlet conduit 216 downstream from the flow meter 202. The bypass flow meter valve 220 may be positioned in a flow meter bypass conduit 222 that extends between the flow meter inlet conduit 206 and the flow meter outlet conduit 216 and otherwise "bypasses" the flow meter 202.

In transitioning the gas extraction system 138 to the bypass flushing configuration, the first and second inline mud valves 218a,b (or at least the first inline mud valve 218a) may be closed while the bypass flow meter valve 220 is opened. As a result, the drilling fluid sample 136 is prevented from circulating through the flow meter 202 and is instead diverted through the flow meter bypass conduit 222 and thereby conveyed to the heater 204. Accordingly, when the gas extraction system 138 is in the bypass flushing configuration, the drilling fluid sample 136 bypasses the flow meter 202 and is conveyed directly to the heater 204.

The gas extraction system 138 may further include a flushing circuit 224 that may be activated and otherwise engaged when the gas extraction system 138 is transitioned to the bypass flushing configuration to flush the flow meter 202. As illustrated, the flushing circuit 224 may include a first flow meter flushing valve 226a, a second flow meter flushing valve 226b, a source of flushing fluid 228, and a pump 230 that circulates the flushing fluid 228 through the flushing circuit 224. The first flow meter flushing valve 226a may be arranged in an inlet flushing conduit 232 that fluidly couples to the flow meter inlet conduit 206 at a point downstream from the first inline mud valve 218a and upstream from the flow meter 202. The pump 230 may also be arranged in the inlet flushing conduit 232 and may interpose the first flow meter flushing valve 226a and the source of the flushing fluid 228. The second flow meter flushing valve 226b may be arranged in an outlet flushing conduit 234 that fluidly couples to the flow meter outlet conduit 216 at a point downstream from the flow meter 202 and upstream from the second inline mud valve 218b.

The pump 230 may comprise a low volume pump such as, but not limited to, a positive displacement pump, a diaphragm pump, a peristaltic pump, a centrifugal pump, or any combination thereof. In some embodiments, suitable y-fittings or clamp laterals (not shown) may be used to fluidly couple the inlet flushing conduit 232 to the flow meter inlet conduit 206 and likewise couple the outlet flushing conduit 234 to the flow meter outlet conduit 216. In other embodiments, other types of pipe couplings or joints may be used, such as T-joints or the like.

At any time following transition of the gas extraction system 138 to the bypass flushing configuration, the flushing circuit 224 may be activated by opening the first and second flow meter flushing valves 226a,b and subsequently (or simultaneously) starting the pump 230. The pump 230 may draw the flushing fluid 228 out of the flushing fluid source (e.g., a reservoir or holding tank) and pump the flushing fluid 228 through the first flow meter flushing valve 226a, into the flow meter inlet conduit 206 and through the flow meter 202. Following the flow meter 202, a spent flushing fluid 236 may be directed into the outlet flushing conduit 234, through the second flow meter flushing valve 226b, and ultimately deposited into a repository 238. As the flushing fluid 228 courses through the flow meter 202, solids buildup that may have formed on the inner workings thereof may be flushed out of the flow meter 202. Consequently, the spent flushing fluid 236 may include portions of the solids buildup in the form of particulate matter or dissolved solids.

The flushing fluid 228 may comprise a variety of types of liquids suitable for removing the solids buildup in the flow meter 202. In some embodiments, for example, the flushing fluid 228 may be selected based on the type of drilling fluid 122 (FIG. 1) circulated in the well system 100 (FIG. 1). More specifically, in the event the drilling fluid 122 is an oil-based drilling fluid, the flushing fluid 228 may comprise a base oil, such as mineral oil, diesel, or a synthetic oil. Alternatively, in the event the drilling fluid 122 is a water-based drilling fluid, the flushing fluid 228 may comprise fresh water.

In some embodiments, particulate matter or materials may be added to the flushing fluid 228 to help agitate and clean the tubing or inner workings of the flow meter 202. Suitable particulate materials that may be added to the flushing fluid 228 may include, but are not limited to, sand, ground shale, ground marble, bauxite, ceramic materials, glass materials, metal pellets, resilient graphitic carbon, cellulose flakes, resins, polymer materials (crosslinked or otherwise), nut shell pieces, seed shell pieces, fruit pit pieces, a composite material, and any combination thereof.

In some embodiments, the spent flushing fluid 236 may be disposed of following circulation through the flushing circuit 224. In other embodiments, however, the spent flushing fluid 236 may be rehabilitated and otherwise cleaned for re-use in the flushing circuit 224. In yet other embodiments, the spent flushing fluid 236 may be re-injected into the flow line 130 (FIG. 1) and otherwise combined with the spent drilling fluid 122 (FIG. 1), without departing from the scope of the disclosure.

To ensure that the flushing is complete and the flow meter 202 is otherwise sufficiently cleaned of the solids buildup, a visual inspection of the spent flushing fluid 236 exiting the outlet flushing conduit 234 and otherwise entering the repository 238 may be undertaken. If the spent flushing fluid 236 is cloudy and otherwise remains "muddy," that may be an indication that at least a portion of the solids buildup remains and still needs to be removed through continued flushing of the flow meter 202. On the other hand, if the spent flushing fluid 236 is clear or substantially clear entering the repository 238, that may be an indication that the flushing operation was successful and, therefore, can be concluded.

In other embodiments, one or more sensors may be included in the flushing circuit 224 and used to determine when the flushing operation is complete and whether the flow meter 202 is otherwise sufficiently cleaned of the solids buildup. As illustrated, the flushing circuit 224 may include a first flush sensor 240a and a second flush sensor 240b. The first flush sensor 240a may be arranged in the inlet flushing conduit 232, such as upstream from the first flow meter flushing valve 226a, and the second flush sensor 240b may be arranged in the outlet flushing conduit 234, such as downstream from the second flow meter flushing valve 226b. In other embodiments, however, the first flush sensor 240a may be arranged at any point in the inlet flushing conduit 232 upstream from the flow meter 202, and the second flush sensor 240b may be arranged in the outlet flushing conduit 234 at any point downstream from the flow meter 202, without departing from the scope of the disclosure.

In one or more embodiments, the first and second flush sensors 240a,b may each comprise a flow meter that measures flow rate of the flushing fluid 228 as it circulates through the flushing circuit 224. Suitable flow meters that may be used as the first and second flush sensors 240a,b include, but are not limited to, a mechanical flow meter, a pressure-based flow meter, an optical flow meter, an electromagnetic flow meter, an ultrasonic flow meter, a vortex flow meter, and any combination thereof. When a flow rate measurement or reading from the second flush sensor 240b is lower than that of the first flush sensor 240a, that may be an indication that solids buildup remains in the flow meter 202 and flushing should continue. On the other hand, when flow rate readings from the first and second flush sensors 240a,b are substantially identical or within a predetermined variance, that may be an indication that the solids buildup has been substantially removed and the flushing operation may be concluded.

In other embodiments, the first and second flush sensors 240a,b may each comprise a pressure sensor configured to measure fluid pressure before and after the flow meter 202, respectively. In at least one embodiment, the pressure sensors may comprise pressure transducers, such as piezoelectric pressure transducers. When a pressure measurement or reading from the second flush sensor 240b is lower than that of the first flush sensor 240a, that may be an indication that solids buildup remains in the flow meter 202 and flushing should continue. On the other hand, when pressure readings from the first and second flush sensors 240a,b are substantially identical or within a predetermined variance, that may be an indication that the solids buildup has been substantially removed and the flushing operation may be concluded.

Any of the valves 218a,b, 220, and 226a,b of the gas extraction system 138 may be manually operated between open and closed positions. In other embodiments, however, opening and closing any of the valves 218a,b, 220, and 226a,b of the gas extraction system 138 may be automated. More specifically, the gas extraction system 138 may include an automated control unit 242 operatively coupled to one or more of the valves 218a,b, 220, and 226a,b. The automated control unit 242 may be used to selectively move one or more of the valves 218a,b, 220, and 226a,b between their respective open and closed positions. As illustrated, the automated control unit 242 may be communicably coupled to and operated by the data acquisition system 210.

In some embodiments, for example, the data acquisition system 210 may receive and process the flow rate measurement 208 and, when the flow rate measurement 208 surpasses a predetermined operational threshold for the flow meter 202, a signal 244 may be sent to the automated control unit 242. The signal 244 may comprise a command to transition the gas extraction system 138 from the flow measurement configuration to the bypass flushing configuration. The signal 244 may further comprise a command to activate the flushing circuit 244 to flush the flow meter 202 once the gas extraction system 138 is transitioned to the bypass flushing configuration. Once the flow rate measurements 208 return to at or below the predetermined operational threshold for the flow meter 202, a new signal 244 may be sent to the automated control unit 242 to cease flushing in the flushing circuit 244 and subsequently transition the gas extraction system 138 back to the flow measurement configuration.

In some embodiments, the gas extraction system 138 may be moved to the bypass flushing configuration and the flushing circuit 244 may be activated to flush the flow meter 202 at predetermined or pre-selected time intervals. For instance, the gas extraction system 138 may be flushed while drill pipe is being added to the drill string 108 (FIG. 1), while the circulation of the drilling fluid 122 (FIG. 1) ceases for approximately four to five minutes. In other embodiments, however, the flushing operation may be undertaken on an as-needed basis and otherwise based on the real-time flow rate measurements 208. Accordingly, the gas extraction system 138 incorporating the flushing circuit 244 may facilitate uninterrupted drilling fluid 122 data with minimal effort.

Figure 3:
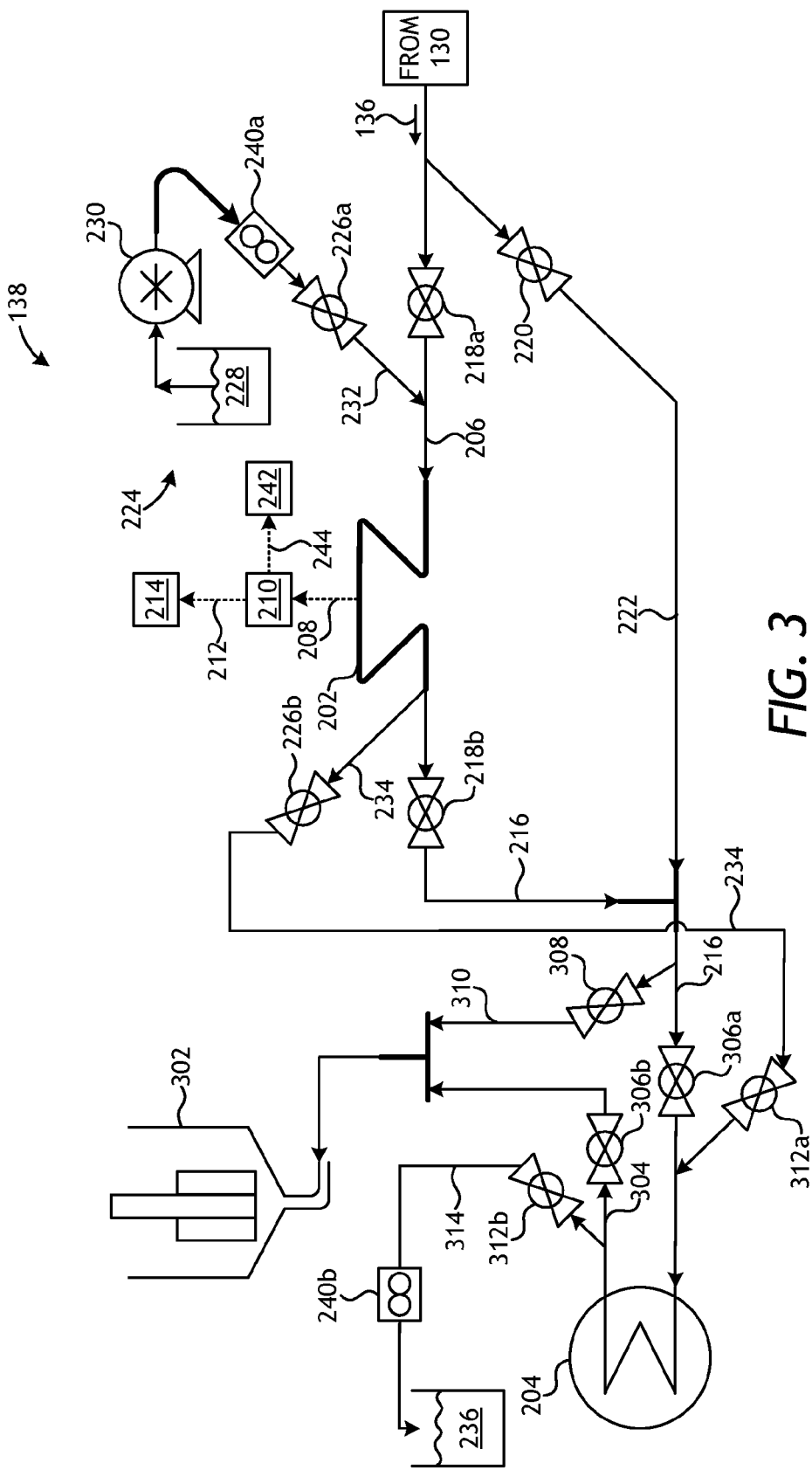
FIG. 3 is a schematic diagram of another embodiment of the gas extraction system of FIG. 1.

Referring now to FIG. 3, with continued reference to FIG. 2, illustrated is a schematic diagram of another embodiment of the gas extraction system 138. Again, the gas extraction system 138 may be manipulatable or otherwise transitioned between the flow measurement configuration and the bypass flushing configuration. In the flow measurement configuration, which may constitute normal operation of the gas extraction system 138, the drilling fluid sample 136 may be conveyed to the flow meter 202 from the flow line 130 (FIG. 1) via the flow meter inlet conduit 206. After circulating through the flow meter 202, the drilling fluid sample 136 may exit the flow meter 202 and flow to the heater 204 via the flow meter outlet conduit 216. As indicated above, the heater 204 may be configured to increase the temperature of the drilling fluid sample 136 to a temperature required for degassing. Accordingly, following the heater 204, the drilling fluid sample 136 may be conveyed and otherwise circulated to a degasser 302 via a heater outlet conduit 304.

Similar to operation of the flow meter 202, over time, solids buildup or residue may begin to grow within the inner workings or tubing of the heater 304, which can inhibit the transfer of heat to the drilling fluid sample 136. When an increase in the core temperature of the heater 204 is detected after initial ramp up, for example, this may be an indication of solids buildup on the inner tubing of the heater 204. In other cases, if there is an above-normal pressure at the delivery pump (not shown) that delivers the drilling fluid sample 136 to the gas extraction system 138, this may also be an indication of solids buildup on the inner tubing of the heater 204. According to the present disclosure, the flushing circuit 224 may further be configured to flush solids buildup from the heater 204. As will be appreciated, flushing the heater 204 may prove advantageous in helping to clear the solids buildup and thereby increase the useful life of the heater.

The solids buildup in the heater 204 may be flushed by transitioning the gas extraction system 138 from the flow measurement configuration, as described above, to the bypass flushing configuration, and thereby return the heater 204 back to normal operation. To accomplish this, and beyond the valves 218a,b, 220, and 226a,b discussed above, the gas extraction system 138 may further include a first inline heater valve 306a, a second inline heater valve 306b, and a bypass heater valve 308. As illustrated, the first inline heater valve 306a may be positioned in the flow meter outlet conduit 216 upstream from the heater 204, and the second inline heater valve 306b may be positioned in the heater outlet conduit 304 downstream from the heater 204. The bypass heater valve 308 may be positioned in a heater bypass conduit 310 that extends between the flow meter outlet conduit 216 and the heater outlet conduit 304 and otherwise "bypasses" the heater 204.

In transitioning the gas extraction system 138 to the bypass flushing configuration, the first and second inline mud valves 218a,b and the first and second inline heater valves 306a,b may be closed while the bypass flow meter valve 220 and the bypass heater valve 308 are each opened. As a result, the drilling fluid sample 136 is prevented from circulating through the flow meter 202 and also prevented from circulating through the heater 204. Instead, the drilling fluid sample 136 is diverted through the flow meter bypass conduit 222 and the heater bypass conduit 310 to be conveyed to the degasser 302. Accordingly, when the gas extraction system 138 is in the bypass flushing configuration, the drilling fluid sample 136 bypasses the flow meter 202 and the heater 204 is conveyed directly to the degasser 302.

Once the gas extraction system 138 is transitioned to the bypass flushing configuration, the flushing circuit 224 may be activated and otherwise engaged to flush the flow meter 202 and the heater 204. In the illustrated embodiment, the flushing circuit 224 may further include a first heater flushing valve 312a and a second heater flushing valve 312b. The first heater flushing valve 312a may be arranged in the outlet flushing conduit 234 that fluidly couples to the flow meter outlet conduit 216 at a point downstream from the first inline heater valve 306a and upstream from the heater 204. The second heater flushing valve 312b may be arranged in a heater outlet flushing conduit 314 that fluidly couples to the heater outlet conduit 304 at a point downstream from the heater 204 and upstream from the second inline heater valve 306b. Again, suitable y-fittings, clamp laterals, or T-joints (not shown) may be used to fluidly couple the outlet flushing conduit 234 to the flow meter outlet conduit 216 and likewise couple the heater outlet flushing conduit 314 to the heater outlet conduit 304.

At any time following transition of the gas extraction system 138 to the bypass flushing configuration, the flushing circuit 224 may be activated by opening the first and second flow meter flushing valves 226a,b and the first and second heater flushing valves 312a,b and subsequently or simultaneously starting the pump 230. As described above, the pump 230 may pump the flushing fluid 228 through the first flow meter flushing valve 226a, into the flow meter inlet conduit 206, and through the flow meter 202. Following the flow meter 202, the flushing fluid 228 may be directed into the outlet flushing conduit 234, through the second flow meter flushing valve 226b, through the first heater flushing valve 312a and into the heater 204. Following the heater 204, the spent flushing fluid 236 may be directed into the heater outlet flushing conduit 314, through the second heater flushing valve 312b, and ultimately deposited into the repository 238. As the flushing fluid 228 courses through the heater 204, solids buildup that may have formed on the inner workings thereof may be flushed out of the heater 204. Consequently, the spent flushing fluid 236 may include portions of the solids buildup in the form of particulate matter or dissolved solids.

To ensure that the flushing is complete and the heater 204 is otherwise cleaned of the solids buildup, a visual inspection of the spent flushing fluid 236 exiting the heater outlet flushing conduit 314 and otherwise entering the repository 238 may be undertaken, as discussed above. In other embodiments, the first and second flush sensors 240 may be used to determine when the flushing operation is complete and whether the flow meter 202 and/or the heater 204 is/are otherwise cleaned of the solids buildup. As with the embodiment of FIG. 2, the first flush sensor 240a may be arranged in the inlet flushing conduit 232. In the illustrated embodiment, however, the second flush sensor 240b may be arranged in the heater outlet flushing conduit 314, such as downstream from the second heater flushing valve 312b. In other embodiments, however the first flush sensor 240a may be arranged at any point in the inlet flushing conduit 232, and the second flush sensor 240b may be arranged in the heater outlet flushing conduit 314 at any point, without departing from the scope of the disclosure.

In embodiments where the first and second flush sensors 240a,b each comprise a flow meter, as discussed above, flow rate measurements or readings from the second flush sensor 240b that are lower than that of the first flush sensor 240a may be an indication that solids buildup remains in the flow meter 202 and/or the heater 204 and flushing should continue. On the other hand, when flow rate readings from the first and second flush sensors 240a,b are substantially identical, that may be an indication that the solids buildup has been substantially removed and the flushing operation may be concluded.

In embodiments where the first and second flush sensors 240a,b each comprise a pressure sensor, such as a pressure transducer, pressure measurements or readings from the second flush sensor 240b that are lower than that of the first flush sensor 240a may be an indication that solids buildup remains in the flow meter 202 and/or heater 204 and flushing should continue. On the other hand, when pressure readings from the first and second flush sensors 240a,b are substantially identical, that may be an indication that the solids buildup has been substantially removed and the flushing operation may be concluded.

As with the embodiment of FIG. 2, any of the valves 218a,b, 220, 226a,b, 306a,b, 308, and 312a,b of the gas extraction system 138 depicted in FIG. 3 may be manually operated between open and closed positions. In other embodiments, however, opening and closing any of the valves 218a,b, 220, 226a,b, 306a,b, 308, and 312a,b may be automated through use of the automated control unit 242. The automated control unit 242 may be operatively coupled to and otherwise used to selectively move one or more of the valves 218a,b, 220, 226a,b, 306a,b, 308, and 312a,b between their respective open and closed positions as directed by the data acquisition system 210.

Figure 4:
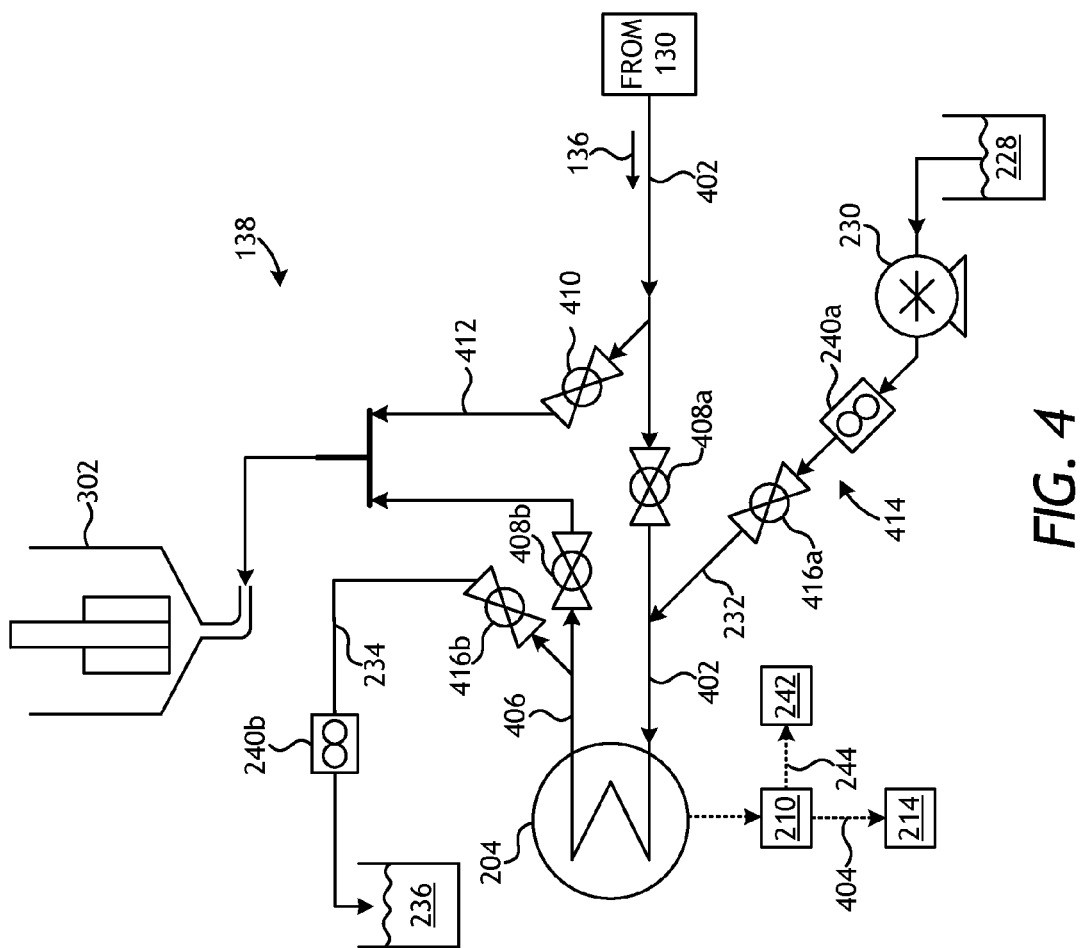
FIG. 4 is a schematic diagram of another embodiment of the gas extraction system of FIG. 1.

Referring now to FIG. 4, with continued reference to the prior figures, illustrated is another schematic diagram of another embodiment of the gas extraction system 138, according to one or more embodiments. As illustrated, the gas extraction system 138 may include the heater 204 and the degasser 330 fluidly coupled to the heater 204. The gas extraction system 138 may be manipulatable or otherwise transitioned between a heating configuration and a bypass flushing configuration. The heating configuration may constitute normal operation of the gas extraction system 138. In the heating configuration, the drilling fluid sample 136 may be conveyed to the gas extraction system 138 from the flow line 130 via a heater inlet conduit 402 that is fluidly coupled to the flow line 130. As with the flow meter inlet conduit 206 (FIGS. 2 and 3), in some embodiments, a delivery pump (not shown) and/or a deaerator (not shown) may be arranged in the heater inlet conduit 402.

The heater inlet conduit 402 may be fluidly or communicably coupled to the inlet to the heater 204. As the drilling fluid sample 136 circulates through the heater 204, the heater 204 may increase the temperature of the drilling fluid sample 136 to a temperature suitable or required for degassing. In some embodiments, the temperature of the heater 204 may be monitored by the data acquisition system 210 and process signals from the heater 204 to provide an output signal 404 indicative of the real-time temperature of the drilling fluid sample 136. In some embodiments, the output signal 404 may be conveyed to the peripheral devices 214 for consideration and/or review by a well operator. After circulating through the heater 204, the drilling fluid sample 136 may exit the heater 204 and flow to the degasser 302 via a heater outlet conduit 406 that fluidly couples the heater 204 and the degasser 302.

Again, over time, solids buildup or residue may begin to grow within the inner workings or tubing of the heater 304, which can inhibit the transfer of heat to the drilling fluid sample 136. When an increase in the core temperature of the heater 204 is detected after initial ramp up, for example, this may be an indication of solids buildup on the inner tubing of the heater 204. In other cases, if there is an above-normal pressure at the delivery pump (not shown) that delivers the drilling fluid sample 136 to the gas extraction system 138, this may also be an indication of solids buildup on the inner tubing of the heater 204. To remove the solids buildup from the heater 204, the heater 204 may be flushed by transitioning the gas extraction system 138 from the heating configuration, as described above, to the bypass flushing configuration. To accomplish this, the gas extraction system 138 may include a first inline mud valve 408a, a second inline mud valve 408b, and a bypass heater valve 410.

As illustrated, the first inline mud valve 408a may be positioned in the heater inlet conduit 402 upstream from the heater 204, and the second inline mud valve 408b may be positioned in the heater outlet conduit 406 downstream from the heater 204. The bypass heater valve 410 may be positioned in a heater bypass conduit 412 that extends between the heater inlet conduit 402 and the heater outlet conduit 406 and otherwise "bypasses" the heater 204. In transitioning the gas extraction system 138 to the bypass flushing configuration, the first and second inline mud valves 408a,b (or at least the first inline mud valve 408a) may be closed while the bypass heater valve 410 is opened. As a result, the drilling fluid sample 136 is prevented from circulating through the heater 204 and is instead diverted through the heater bypass conduit 412 and thereby conveyed to the degasser 302. Accordingly, when the gas extraction system 138 is in the bypass flushing configuration, the drilling fluid sample 136 bypasses the heater 204 and is conveyed directly to the degasser 302.

The gas extraction system 138 may further include a flushing circuit 414 that may be activated and otherwise engaged when the gas extraction system 138 is transitioned to the bypass flushing configuration to flush the heater 204. As illustrated, the flushing circuit 414 may include a first heater flushing valve 416a, a second heater flushing valve 416b, the source of flushing fluid 228, and the pump 230 that circulates the flushing fluid 228 through the flushing circuit 414. The first heater flushing valve 416a may be arranged in the inlet flushing conduit 232 that fluidly couples to the heater inlet conduit 402 at a point downstream from the first inline mud valve 408a and upstream from the heater 204. The second heater flushing valve 416b may be arranged in the outlet flushing conduit 234 that fluidly couples to the heater outlet conduit 406 at a point downstream from the heater 204 and upstream from the second inline mud valve 408b.

At any time following transition of the gas extraction system 138 to the bypass flushing configuration, the flushing circuit 414 may be activated by opening the first and second heater flushing valves 416a,b and subsequently (or simultaneously) starting the pump 230. The pump 230 may draw the flushing fluid 228 out of the flushing fluid source (e.g., a reservoir or holding tank) and pump the flushing fluid 228 through the first heater flushing valve 416a, into the heater inlet conduit 402 and through the heater 204. Following the heater 204, a spent flushing fluid 236 may be directed into the outlet flushing conduit 234, through the second heater flushing valve 416b, and ultimately deposited into the repository 238. As the flushing fluid 228 courses through the heater 204, solids buildup that may have formed on the inner workings thereof may be flushed out of the heater 204.

To ensure that the flushing is complete and the heater 204 is otherwise sufficiently cleaned of the solids buildup, a visual inspection of the spent flushing fluid 236 exiting the outlet flushing conduit 234 and otherwise entering the repository 238 may be undertaken. In other embodiments, the first and second flush sensors 240a,b may be used to determine when the flushing operation is complete and whether the heater 204 is otherwise sufficiently cleaned of the solids buildup, as generally described above.

As with prior embodiments, any of the valves 408a,b, 410, and 416a,b of the gas extraction system 138 may be manually operated between open and closed positions. In other embodiments, however, opening and closing any of the valves 408a,b, 410, and 416a,b of the gas extraction system 138 may be automated using the automated control unit 242, which may selectively move one or more of the valves 408a,b, 410, and 416a,b between their respective open and closed positions upon receiving the signal 244 indicating that the temperature of the heater 204 surpasses a predetermined operational threshold.

In some embodiments, the gas extraction system 138 may be moved to the bypass flushing configuration and the flushing circuit 414 may be activated to flush the heater 204 at predetermined or pre-selected time intervals. In other embodiments, however, the flushing operation may be undertaken on an as-needed basis.

The data acquisition system 210 and the automated control unit 242 used any of the embodiments may include computer hardware used to implement the various methods and algorithms described herein. Such computer hardware can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. A gas extraction system that includes a flow meter that receives a drilling fluid sample via a flow meter inlet conduit and discharges the drilling fluid sample into a flow meter outlet conduit, a first inline mud valve positioned in the flow meter inlet conduit and a second inline mud valve positioned in the flow meter outlet conduit, a bypass flow meter valve positioned in a flow meter bypass conduit that extends between the flow meter inlet conduit and the flow meter outlet conduit, and a flushing circuit. The flushing circuit includes a first flow meter flushing valve arranged in an inlet flushing conduit fluidly coupled to the flow meter inlet conduit downstream from the first inline mud valve and upstream from the flow meter, a second flow meter flushing valve arranged in an outlet flushing conduit fluidly coupled to the flow meter outlet conduit downstream from the flow meter and upstream from the second inline mud valve, and a pump arranged in the inlet flushing conduit to circulate a flushing fluid through the flushing circuit. The gas extraction system is transitioned between a flow measurement configuration and a bypass flushing configuration by closing the first and second inline mud valves and opening the bypass flow meter valve, and wherein the flow meter is flushed with the flushing fluid by opening the first and second flow meter flushing valves and starting the pump.

B. A method of operating a gas extraction system that includes receiving at a flow meter a drilling fluid sample via a flow meter inlet conduit and discharging the drilling fluid sample into a flow meter outlet conduit when the gas extraction system is in a flow measurement configuration, closing a first inline mud valve positioned in the flow meter inlet conduit and closing a second inline mud valve positioned in the flow meter outlet conduit to transition the gas extraction system to a bypass flushing configuration, opening a bypass flow meter valve positioned in a flow meter bypass conduit that extends between the flow meter inlet conduit and the flow meter outlet conduit, and thereby diverting the drilling fluid sample around the flow meter, flushing the flow meter with a flushing fluid to remove solids buildup by opening a first flow meter flushing valve arranged in an inlet flushing conduit fluidly coupled to the flow meter inlet conduit downstream from the first inline mud valve and upstream from the flow meter, opening a second flow meter flushing valve arranged in an outlet flushing conduit fluidly coupled to the flow meter outlet conduit downstream from the flow meter and upstream from the second inline mud valve, and starting a pump arranged in the inlet flushing conduit to circulate the flushing fluid through the flow meter.

C. A gas extraction system that includes a heater that receives a drilling fluid sample via a heater inlet conduit and discharges the drilling fluid sample into a heater outlet conduit, a first inline mud valve positioned in the heater inlet conduit and a second inline mud valve positioned in the heater outlet conduit, a bypass heater valve positioned in a heater bypass conduit that extends between the heater inlet conduit and the heater outlet conduit, and a flushing circuit that includes a first heater flushing valve arranged in an inlet flushing conduit fluidly coupled to the heater inlet conduit downstream from the first inline mud valve and upstream from the heater, a second heater flushing valve arranged in an outlet flushing conduit fluidly coupled to the heater outlet conduit downstream from the heater and upstream from the second inline mud valve, and a pump arranged in the inlet flushing conduit to circulate a flushing fluid through the flushing circuit, wherein the gas extraction system is transitioned between a heating configuration and a bypass flushing configuration by closing the first and second inline mud valves and opening the bypass heater valve, and wherein the heater is flushed with the flushing fluid by opening the first and second heater flushing valves and starting the pump.

D. A method of operating a gas extraction system that includes receiving at a heater a drilling fluid sample via a heater inlet conduit and discharging the drilling fluid sample into a heater outlet conduit when the gas extraction system is in a heating configuration, closing a first inline mud valve positioned in the heater inlet conduit and closing a second inline mud valve positioned in the heater outlet conduit to transition the gas extraction system to a bypass flushing configuration, opening a bypass heater valve positioned in a heater bypass conduit that extends between the heater inlet conduit and the heater outlet conduit, and thereby diverting the drilling fluid sample around the heater, flushing the heater with a flushing fluid to remove solids buildup by opening a first heater flushing valve arranged in an inlet flushing conduit fluidly coupled to the heater inlet conduit downstream from the first inline mud valve and upstream from the heater, opening a second heater flushing valve arranged in an outlet flushing conduit fluidly coupled to the heater outlet conduit downstream from the heater and upstream from the second inline mud valve, and starting a pump arranged in the inlet flushing conduit to circulate the flushing fluid through the heater.

Each of embodiments A, B, C, and C may have one or more of the following additional elements in any combination: Element 1: wherein the flow meter is selected from the group consisting of a Coriolis flow meter, a mechanical flow meter, a pressure-based flow meter, an electromagnetic flow meter, an ultrasonic flow meter, and any combination thereof. Element 2: further comprising a data acquisition system communicably coupled to the flow meter to receive and process flow rate measurements derived from the flow meter, and one or more peripheral devices communicably coupled to the data acquisition system to provide a graphical output representative of the flow rate measurements. Element 3: further comprising an automated control unit communicably coupled to the data acquisition system and operatively coupled to one or more of the first and second inline mud valves, the bypass flow meter valve, and the first and second flow meter flushing valves. Element 4: wherein the flushing fluid comprises at least one of a base oil and water. Element 5: wherein the flushing fluid includes particulate materials selected from the group consisting of sand, ground shale, ground marble, bauxite, ceramic materials, glass materials, metal pellets, resilient graphitic carbon, cellulose flakes, resins, polymer materials, nut shell pieces, seed shell pieces, fruit pit pieces, a composite material, and any combination thereof. Element 6: further comprising a first flush sensor arranged in the inlet flushing conduit, and a second flush sensor arranged in the outlet flushing conduit, wherein the first and second flush sensors each comprise a flow meter or a pressure transducer. Element 7: further comprising a heater fluidly coupled to the flow meter via the flow meter outlet conduit, a degasser fluidly coupled to the heater via a heater outlet conduit, a first inline heater valve arranged in the flow meter outlet conduit downstream from the second inline flow meter valve and a second inline heater valve arranged in the heater outlet conduit, and a bypass heater valve arranged in a heater bypass conduit extending between the flow meter outlet conduit and the heater outlet conduit, wherein the flushing circuit further includes a first heater flushing valve arranged in the outlet flushing conduit downstream from the second flow meter flushing valve, the outlet flushing conduit being fluidly coupled to the flow meter outlet conduit downstream from the first inline heater valve and upstream from the heater, and a second heater flushing valve arranged in a heater outlet flushing conduit fluidly coupled to the heater outlet conduit downstream from the heater and upstream from the second inline heater valve, wherein the gas extraction system is further transitioned between the flow measurement configuration and the bypass flushing configuration by closing the first and second inline heater valves and opening the bypass heater valve, and wherein the flow meter and the heater are flushed with the flushing fluid by further opening the first and second flow meter flushing valves. Element 8: further comprising a data acquisition system communicably coupled to the flow meter to receive and process flow rate measurements derived from the flow meter, and an automated control unit communicably coupled to the data acquisition system and operatively coupled to one or more of the first and second inline mud valves, the bypass flow meter valve, the first and second flow meter flushing valves, the first and second inline heater valves, the bypass heater valve, and the first and second heater flushing valves.

Element 9: further comprising receiving and processing flow rate measurements derived from the flow meter at a data acquisition system communicably coupled to the flow meter, and providing a graphical output representative of the flow rate measurements with one or more peripheral devices communicably coupled to the data acquisition system. Element 10: selectively operating one or more of the first and second inline mud valves, the bypass flow meter valve, and the first and second flow meter flushing valves with an automated control unit communicably coupled to the data acquisition system. Element 11: wherein flushing the flow meter with the flushing fluid comprises flushing the flow meter with a flushing fluid that includes particulate materials selected from the group consisting of sand, ground shale, ground marble, bauxite, ceramic materials, glass materials, metal pellets, resilient graphitic carbon, cellulose flakes, resins, polymer materials, nut shell pieces, seed shell pieces, fruit pit pieces, a composite material, and any combination thereof. Element 12: further comprising monitoring the flushing fluid with a first flush sensor arranged in the inlet flushing conduit, and monitoring the flushing fluid with a second flush sensor arranged in the outlet flushing conduit. Element 13: wherein the first and second flush sensors each comprise a flow meter, the method further comprising continuing flushing the flow meter with the flushing fluid when a flow rate reading from the second flush sensor is lower than a flow rate reading from the first flush sensor, and stopping flushing when the flow rate readings from the first and second flush sensors are within a predetermined variance. Element 14: wherein the first and second flush sensors each comprise a pressure transducer, the method further comprising continuing flushing the flow meter with the flushing fluid when a pressure reading from the second flush sensor is lower than a pressure reading from the first flush sensor, and stopping flushing when the pressure readings from the first and second flush sensors within a predetermined variance. Element 15: further comprising receiving the drilling fluid sample from the flow meter at a heater fluidly coupled to the flow meter via the flow meter outlet conduit when the gas extraction system is in the flow measurement configuration, receiving the drilling fluid sample from the heater at a degasser fluidly coupled to the heater via a heater outlet conduit when the gas extraction system is in the flow measurement configuration, closing a first inline heater valve arranged in the flow meter outlet conduit downstream from the second inline flow meter valve in transitioning the gas extraction system to the bypass flushing configuration, closing a second inline heater valve arranged in the heater outlet conduit in transitioning the gas extraction system to the bypass flushing configuration, opening a bypass heater valve arranged in a heater bypass conduit extending between the flow meter outlet conduit and the heater outlet conduit in transitioning the gas extraction system to the bypass flushing configuration, flushing the heater with the flushing fluid to remove solids buildup by opening a first heater flushing valve arranged in the outlet flushing conduit downstream from the second flow meter flushing valve, the outlet flushing conduit being fluidly coupled to the flow meter outlet conduit downstream from the first inline heater valve and upstream from the heater, and opening a second heater flushing valve arranged in a heater outlet flushing conduit fluidly coupled to the heater outlet conduit downstream from the heater and upstream from the second inline heater valve. Element 16: further comprising receiving and processing flow rate measurements derived from the flow meter with a data acquisition system communicably coupled to the flow meter, and selectively actuating one or more of the first and second inline mud valves, the bypass flow meter valve, the first and second flow meter flushing valves, the first and second inline heater valves, the bypass heater valve, and the first and second heater flushing valves with an automated control unit communicably coupled to the data acquisition system. Element 17: further comprising visually inspecting the spent flushing fluid to determine whether flushing of the flow meter and the heater is complete.

Element 18: further comprising a data acquisition system communicably coupled to the heater to receive and process temperature measurements derived from the heater, and an automated control unit communicably coupled to the data acquisition system and operatively coupled to one or more of the first and second inline mud valves, the bypass heater valve, and the first and second heater flushing valves.

Element 19: further comprising receiving and processing temperature measurements derived from the heater at a data acquisition system communicably coupled to the heater, and selectively operating one or more of the first and second inline mud valves, the bypass heater valve, and the first and second heater flushing valves with an automated control unit communicably coupled to the data acquisition system.

By way of non-limiting example, exemplary combinations applicable to A, B, C and D include: Element 2 with Element 3; Element 7 with Element 8; Element 9 with Element 10; Element 12 with Element 13; Element 13 with Element 14; Element 15 with Element 16; and Element 15 with Element 17.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method of operating a gas extraction system, comprising:
receiving at a flow meter a drilling fluid sample via a flow meter inlet conduit and discharging the drilling fluid sample into a flow meter outlet conduit when the gas extraction system is in a flow measurement configuration;
closing a first inline mud valve positioned in the flow meter inlet conduit and closing a second inline mud valve positioned in the flow meter outlet conduit to transition the gas extraction system to a bypass flushing configuration;
opening a bypass flow meter valve positioned in a flow meter bypass conduit that extends between the flow meter inlet conduit and the flow meter outlet conduit, and thereby diverting the drilling fluid sample around the flow meter;
flushing the flow meter with a flushing fluid to remove solids buildup by:
opening a first flow meter flushing valve arranged in an inlet flushing conduit fluidly coupled to the flow meter inlet conduit downstream from the first inline mud valve and upstream from the flow meter;
opening a second flow meter flushing valve arranged in an outlet flushing conduit fluidly coupled to the flow meter outlet conduit downstream from the flow meter and upstream from the second inline mud valve; and
starting a pump arranged in the inlet flushing conduit to circulate the flushing fluid through the flow meter.

2. The method of claim 1, further comprising:
receiving and processing flow rate measurements derived from the flow meter at a data acquisition system communicably coupled to the flow meter; and
providing a graphical output representative of the flow rate measurements with one or more peripheral devices communicably coupled to the data acquisition system.

3. The method of claim 2, selectively operating one or more of the first and second inline mud valves, the bypass flow meter valve, and the first and second flow meter flushing valves with an automated control unit communicably coupled to the data acquisition system.

4. The method of claim 1, wherein flushing the flow meter with the flushing fluid comprises flushing the flow meter with a flushing fluid that includes particulate materials selected from the group consisting of sand, ground shale, ground marble, bauxite, ceramic materials, glass materials, metal pellets, resilient graphitic carbon, cellulose flakes, resins, polymer materials, nut shell pieces, seed shell pieces, fruit pit pieces, a composite material, and any combination thereof.

5. The method of claim 1, further comprising:
monitoring the flushing fluid with a first flush sensor arranged in the inlet flushing conduit; and
monitoring the flushing fluid with a second flush sensor arranged in the outlet flushing conduit.

6. The method of claim 5, wherein the first and second flush sensors each comprise a flow meter, the method further comprising:
continuing flushing the flow meter of the receiving step with the flushing fluid when a flow rate reading from the second flush sensor is lower than a flow rate reading from the first flush sensor; and
stopping flushing when the flow rate readings from the first and second flush sensors are within a predetermined variance.

7. The method of claim 5, wherein the first and second flush sensors each comprise a pressure transducer, the method further comprising:
continuing flushing the flow meter with the flushing fluid when a pressure reading from the second flush sensor is lower than a pressure reading from the first flush sensor; and
stopping flushing when the pressure readings from the first and second flush sensors within a predetermined variance.

8. The method of claim 1, further comprising:
receiving the drilling fluid sample from the flow meter at a heater fluidly coupled to the flow meter via the flow meter outlet conduit when the gas extraction system is in the flow measurement configuration;
receiving the drilling fluid sample from the heater at a degasser fluidly coupled to the heater via a heater outlet conduit when the gas extraction system is in the flow measurement configuration;
closing a first inline heater valve arranged in the flow meter outlet conduit downstream from the second inline flow meter valve in transitioning the gas extraction system to the bypass flushing configuration;
closing a second inline heater valve arranged in the heater outlet conduit in transitioning the gas extraction system to the bypass flushing configuration;
opening a bypass heater valve arranged in a heater bypass conduit extending between the flow meter outlet conduit and the heater outlet conduit in transitioning the gas extraction system to the bypass flushing configuration; and
flushing the heater with the flushing fluid to remove solids buildup by:
opening a first heater flushing valve arranged in the outlet flushing conduit downstream from the second flow meter flushing valve, the outlet flushing conduit being fluidly coupled to the flow meter outlet conduit downstream from the first inline heater valve and upstream from the heater; and
opening a second heater flushing valve arranged in a heater outlet flushing conduit fluidly coupled to the heater outlet conduit downstream from the heater and upstream from the second inline heater valve.

9. The method of claim 8, further comprising:
receiving and processing flow rate measurements derived from the flow meter with a data acquisition system communicably coupled to the flow meter; and
selectively actuating one or more of the first and second inline mud valves, the bypass flow meter valve, the first and second flow meter flushing valves, the first and second inline heater valves, the bypass heater valve, and the first and second heater flushing valves with an automated control unit communicably coupled to the data acquisition system.

10. The method of claim 8, further comprising visually inspecting the spent flushing fluid to determine whether flushing of the flow meter and the heater is complete.

\* \* \* \* \*